A. B. JENNINGS.
TOOL HANDLE.
APPLICATION FILED OCT. 24, 1914.
1,144,710.
Patented June 29, 1915.
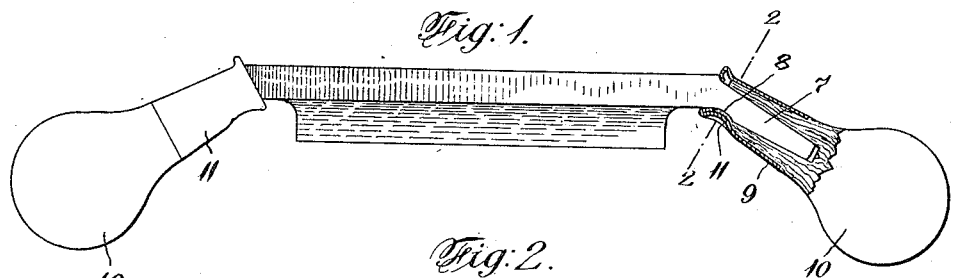
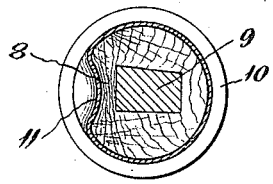
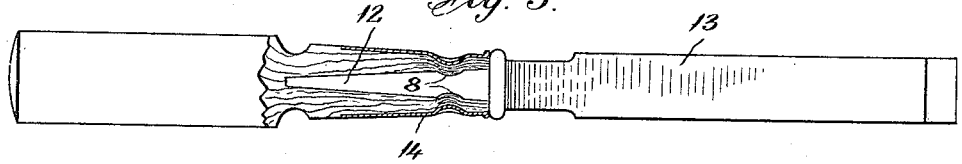
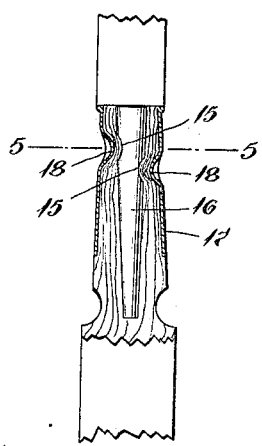
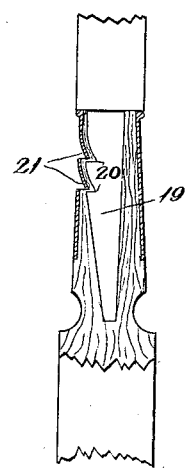
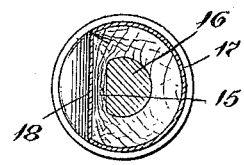
Witnesses:
John J. Kittel
Frank E. Horn
Archer B. Jennings
Inventor
By his Attorney
Alfred Shedlock
THE NORRIS PETERS CO., PHOTO-LITHO., WASHINGTON, D. C.

UNITED STATES PATENT OFFICE.

ARCHER B. JENNINGS, OF MERIDEN, CONNECTICUT.

TOOL-HANDLE.

1,144,710. Specification of Letters Patent. Patented June 29, 1915.

Application filed October 24, 1914. Serial No. 868,542.

*To all whom it may concern:*

Be it known that I, ARCHER B. JENNINGS, a citizen of the United States, and a resident of Meriden, county of New Haven, State of Connecticut, have invented new and useful Improvements in Tool-Handles, of which the following is a specification.

This invention relates to tool handles, particularly to simple and inexpensive means for fastening the tools in the handles.

Handles of tools to which this invention applies generally consist of compressible material, as wood, provided with central bores into which the shanks of the tools are driven and with ferrules surrounding their tool ends. The tool shanks are provided with one or more recesses, notches or grooves made in their sides when they are forged or otherwise formed. After the shanks have been driven in the handles depressions are, by suitable tools, formed in the ferrules in front of said recesses in the shanks, thus producing projections inside the ferrules which partly or fully enter the recesses. The formation of the depressions in the ferrules compresses the material of the handles between the ferrules and the shanks, thus constituting at such shank locking places condensed wooden wedges, which act, in conjunction with the internal projections of the ferrules to positively and firmly hold all of the parts together.

The recesses, notches or grooves in the shanks may partake of various forms, a few of which are illustrated in the accompanying drawings, to which I will now refer to more fully describe my invention.

Figure 1 represents a draw knife, showing one of the handles in section. Fig. 2 is a transverse section on the line 2, 2, Fig. 1. Fig. 3 illustrates a chisel with two recesses arranged in the opposite sides of the shank and corresponding depressions in the handle ferrule. Fig. 4 shows a round shank tool with recesses alternately opposed in the sides of the shank. Fig. 5 is a transverse section of the same on the line 5, 5, and; Fig. 6 illustrates a tool shank with serrations or angular recesses formed in its side.

The shank 7 of the draw knife, Fig. 1, has one recess 8, and the ferrule 9 of the handle 10 is depressed or forced inwardly as shown, thus forming a projection 11 which enters the recess and condenses the material of the handle between the ferrule and the shank where the recess occurs. In Fig. 3 two recesses 8 are shown in the opposite sides of the shank 12 of a chisel 13, the ferrule 14 of the handle being depressed in line with said recesses, thus forming a locking means on each side of the shank. Two recesses 15 may be made in the shank of a tool, arranged as shown in Fig. 4, one above the other on opposite sides of the shank 16 and the ferrule 17 is correspondingly depressed to form the coacting projections 18 to enter the recesses. In this case a round shank is shown, see Fig. 5. Another form of the locking means is illustrated at Fig. 6, the tool shank 19 being serrated or provided with angular recesses 20, and the ferrule correspondingly depressed to form coacting locking projections 21.

The locking projections of the ferrules may be made by narrow depressions of substantially the same width as the shanks, as shown in Figs. 1 and 2, or the depressions may extend of uniform depth fully across the ferrules, as shown in the other views of the drawings. The style or form of recesses in the shanks and the shape and manner of forming the depressions in the ferrules will be a matter of selection, the gist of the invention residing in positive locking means for securing tools in handles consisting of recesses in the shanks of the tools and projections on the ferrules adapted to enter the recesses, a feature of the invention being the compression of the material of the handle between the ferrules and the recesses of the shanks produced by the formation of the locking projections, and also, in some cases, a compression of the handles fully across them. The compression of the material of the handles at the points mentioned constitutes condensed wooden wedges between the ferrules and the shanks, and at the same time provide means for securely fastening the ferrules on the handles.

I claim:

1. A tool handle fastening consisting of a tool shank for insertion in a handle and having a laterally disposed recess in the side thereof, a ferrule on the end of the handle and a depression formed in the ferrule in front of the recess in the shank, whereby the material of the handle adjacent the recesses in the shank is compressed therein and the tool securely held in the handle.

2. In a tool handle fastener, in combination a tool handle of a compressible material, a tool whose shank is inserted in the handle, one or more lateral recesses formed in the shank, a ferrule surrounding the end of the handle and a corresponding number of depressions formed in the ferrule in front of the recesses, thus acting to produce mutual locking connections between the three parts by producing internal projections which enter said recesses and compresses the handle between the projections of the ferrule and the recesses in the shank.

3. A tool handle fastening consisting of a tool shank for insertion in a handle and having a laterally disposed recess in the side thereof, a ferrule on the end of the handle surrounding the shank, a depression formed in the ferrule opposite the recess in the shank and the handle with the compressed portion located between the projection produced by the depression made in the ferrule and the recess in the shank of the tool constituting a condensed wooden wedge, whereby the handle the tool and the ferrule are securely connected together.

In testimony whereof I have hereunto subscribed in my name.

ARCHER B. JENNINGS.

In the presence of—
SERENO W. SMITH,
F. H. McGAR.

Copies of this patent may be obtained for five cents each, by addressing the "Commissioner of Patents, Washington, D. C."